US010888097B2

(12) United States Patent
Osswald et al.

(10) Patent No.: US 10,888,097 B2
(45) Date of Patent: Jan. 12, 2021

(54) WEIGHING SYSTEM

(71) Applicant: Albert Handtmann Maschinenfabrik GmbH & Co. KG, Biberach (DE)

(72) Inventors: Florian Osswald, Ulm (DE); Robert Winghart, Oberstadion (DE); Klaus Schmid, Riedlingen (DE); Kurt Strohm, Attenweiler (DE); Jochen Merk, Ochsenhausen (DE); Gerhard Schliesser, Wain (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 599 days.

(21) Appl. No.: 15/807,445

(22) Filed: Nov. 8, 2017

(65) Prior Publication Data

US 2018/0125081 A1    May 10, 2018

(30) Foreign Application Priority Data

Nov. 9, 2016 (EP) ..................................... 16197901

(51) Int. Cl.
| A22C 11/00 | (2006.01) |
| A22C 11/02 | (2006.01) |
| G01G 19/06 | (2006.01) |
| G01G 19/14 | (2006.01) |
| G01G 11/08 | (2006.01) |
| G01G 13/28 | (2006.01) |
| A22C 15/00 | (2006.01) |
| G01G 19/00 | (2006.01) |
| G01G 21/22 | (2006.01) |

(52) U.S. Cl.
CPC ...... *A22C 11/0254* (2013.01); *A22C 11/0245* (2013.01); *A22C 15/001* (2013.01); *G01G 11/08* (2013.01); *G01G 13/28* (2013.01); *G01G 19/00* (2013.01); *G01G 19/06* (2013.01); *G01G 19/14* (2013.01); *G01G 21/22* (2013.01)

(58) Field of Classification Search
CPC ..... A22C 11/00; A22C 11/02; A22C 11/0245; A22C 11/0254
USPC ....................... 452/30–32, 35–37, 46–48, 51
See application file for complete search history.

(56) References Cited

U.S. PATENT DOCUMENTS 6,056,635 A    5/2000 Vermeer et al.
6,196,912 B1*  3/2001 Lawler, Jr. ........... A22B 5/0064
                                              452/173
(Continued)

FOREIGN PATENT DOCUMENTS

CN    201752498 U    3/2011
EP    2305043 A1     4/2011
(Continued)

OTHER PUBLICATIONS

Japan Patent Office, Office Action Issued in Application No. 2017-197904, dated Sep. 25, 2018, 10 pages.
(Continued)

*Primary Examiner* — Richard T Price, Jr.
(74) *Attorney, Agent, or Firm* — McCoy Russell LLP

(57) ABSTRACT

A filling machine includes a suspension device, and is operable to suspend sausages, in particular sausage chains, with a plurality of circulating suspension hooks. The suspension device includes an integrated weighing unit for weighing at least one sausage or at least one sausage chain.

20 Claims, 11 Drawing Sheets

(56) References Cited

U.S. PATENT DOCUMENTS

| | | | | |
|---|---|---|---|---|
| 6,796,892 | B2* | 9/2004 | Allen | A22B 5/00 452/106 |
| 7,210,993 | B2* | 5/2007 | Woods | A22B 5/0064 452/149 |
| 7,553,222 | B2* | 6/2009 | Jackel | G01P 3/68 452/38 |
| 7,572,176 | B2* | 8/2009 | Petersen | A22C 21/00 452/184 |
| 7,918,718 | B2* | 4/2011 | Christensen | A22B 5/007 452/157 |
| 8,308,533 | B2* | 11/2012 | Haslacher | A22C 11/00 452/32 |
| 8,708,782 | B2* | 4/2014 | Kessler | A22C 15/001 452/51 |
| 8,758,099 | B2* | 6/2014 | Reifenhaeuser | B26D 5/34 452/157 |
| 2011/0081462 | A1 | 4/2011 | Meyrahn et al. | |
| 2014/0073231 | A1 | 3/2014 | Fischer et al. | |

FOREIGN PATENT DOCUMENTS

| | | |
|---|---|---|
| JP | S5878534 A | 5/1983 |
| JP | H09009861 A2 | 1/1997 |
| JP | H09131157 A2 | 5/1997 |
| JP | 2012024047 A2 | 2/2012 |
| JP | 2015520607 A | 7/2015 |
| WO | 9817119 A1 | 4/1998 |
| WO | 2015156663 A1 | 10/2015 |

OTHER PUBLICATIONS

China National Intellectual Property Administration of the People's Republic of China, Office Action and Search Report Issued in Application No. 201711090888.2, dated Aug. 5, 2019, 29 pages. (Submitted with Partial Translation).

* cited by examiner

WEIGHING SYSTEM

CROSS-REFERENCE TO RELATED APPLICATIONS

The present application claims priority to European Patent Application No. 16197901.8, entitled "WEIGHING SYSTEM," filed on Nov. 9, 2016, the entire contents of which are hereby incorporated by reference for all purposes.

TECHNICAL FIELD

The present disclosure relates to a suspension device, a filling machine as well as an operating method for producing sausages.

BACKGROUND AND SUMMARY

In the production of sausages or sausage products by means of filling and portioning systems, sausage casings, e.g. natural, artificial or collagen casings, are filled with a pasty mass by means of a filling machine, in particular a vacuum filling machine. By twisting off the stuffed casing, a sausage chain of interconnected individual sausages or portions is obtained in the twist-off line. When the sausage chain is being transferred to a suspension unit, predetermined points of division are gripped by hooks, so that a plurality of sausage loops will be formed from the sausage chain on the suspension unit (cf. e.g. FIG. 10A). Such a loop consists of a plurality of sausages (3-loop, 4-loop, in FIG. 10A 6-loop). The sausages may, however, also be suspended in pairs (FIG. 10B) or individual sausages may be suspended e.g. from a lug on a hook (FIG. 10C).

A plurality of hooks with the respective sausages may be combined so as to form so-called sausage groups, as can be seen e.g. from FIG. 11. The sausage chains are separated at the group transition, and the open ends of the portions are closed (clipped, knotted, welded), if necessary. When the products are removed from the suspension unit, e.g. a smoke stick is inserted (threaded into) the sausage loops of a group, and subsequently the smoke stick having the sausage loop attached thereto is removed from the hook for further processing, as can be seen e.g. from FIG. 2.

For optimizing the filling process or production sequence with the aim of achieving the highest possible accuracy of portion weights, e.g. a weight of the sausages that is as constant as possible, the sausages are weighed with the aid of a separate weighing system before or during product removal at predefined time intervals or after a predefined production volume. In so doing, individual or interconnected sausages or smoke sticks that are fully laden with sausage loops may be weighed. To this end, e.g. stand-alone weighing systems may be used as smoke-stick/portion weighing scales. The space available in the production hall is, however, limited. A stand-alone weighing system requires additional space next to the actual filling and portioning system. The machine operator must remove the products and walk to the weighing system. This interferes with the actual workflow of the operator and may lead to comparatively long interruptions/stops of production. Also weighing systems are already known, which are fixed to the ceiling of the production hall. This kind of positioning will, however, entail high installation costs. The installation site of the filling and portioning system is no longer flexible. Also weighing systems fixed to production hall walls are disadvantageous, since also in this case the machine operator will have to remove the products and walk to the weighing system. In some cases, only one weighing scale is provided for a plurality of filling lines and machine operators. This will disturb the actual workflow of the operator, and waiting times may lead to interruptions or stops of production.

Moreover, the sausages suspended from the smoke stick in the form of sausage loops may shift on the smoke stick during transport to the weighing scale, so that a uniform distance between the sausages will not be guaranteed, a circumstance that will be disadvantageous for the subsequent treatment steps, such as smoking etc., since the products must not be in contact with one another during such treatment.

Taking this as a basis, it is the object of the present disclosure to improve, in a simple manner, the portioning accuracy of the sausages produced and to disturb the production sequence to the least possible extent.

According to the present disclosure, the weighing unit is integrated in the suspension device. Hence, the sausages need no longer be transported from the suspension device to the weighing unit, whereby interruptions or stops of production can be prevented or at least reduced to a substantial extent. The filling process and the production sequence can thus be optimized. Due to the fact that the weighing unit is integrated in the suspension unit, no additional space for the weighing unit will be necessary in the production hall. Due to the fact that the weighing unit is integrated in the suspension unit, neither additional installation work nor additional installation costs will be caused. Taking all this into account, the weighing unit can be realized at a more reasonable price. The weighing unit is thus advantageously movable together with the suspension device in the production room and is not restricted to a specific place. This provides extraordinary flexibility, since the position of the individual machines can freely be selected and changed. Due to the integrated weighing cell, the workflow of the operators of the suspension device is less interfered with, since the weighing process can be carried out directly on the suspension device.

According to an exemplary embodiment, the weighing unit is fixed to the suspension device and comprises a weighing tray for depositing thereon the at least one sausage or the at least one sausage chain and/or a weighing tray for depositing thereon a smoke stick, in particular in the form of a fork, laden with sausage loops, the weighing tray being connected to a weighing cell. Due to the fact that the weighing unit with the weighing tray is fixed to the suspension device, the operator need not change his position during the weighing process and will be able to carry out the weighing operation and to simultaneously continue operating and monitoring the suspension device. Also during the weighing process, he will always be able to keep an eye on the suspension device.

It will be particularly advantageous to arrange the weighing tray in a plane above the circulating suspension hooks, when seen in a vertical direction. Hence, the operator can keep an eye on the sausages to be weighed during the weighing process, and simultaneously he will be able to work with the circulating hooks below the weighing tray. Moreover, this arrangement is extremely space-saving, since this space above the suspension hooks is free and unutilized anyhow. If the weighing tray is arranged above the circulating suspension hooks, the weighing unit can also be used from both sides of the suspension device in an advantageous manner.

However, the present disclosure allows not only a manual weighing process but also a semi-automatic or an automatic weighing process, in the case of which at least one suspension hook is connected to a weighing cell such that the weight of the at least one sausage or sausage chain can be determined on the suspension hook. This means that the weight of the at least one sausage on at least one hook acts on a weighing cell. In this case, the hook may e.g. be connected to the weighing cell via a unit, which holds the hook and carries its weight. Optionally, this unit for holding the weight also has a guide function for the hook.

Hence, it is possible to determine the weight of the at least one sausage on at least one hook, e.g. the weight of a desired number of sausages, without the necessity of removing these sausages from the hooks. This will substantially simplify the production sequence and lead to an extreme improvement in performance and reduction of costs. An additional production stop, which is of advantage e.g. in the case of the manual weighing process, is not necessary. Since the weighing process is integrated in the operator's workflow, the workload of the operator will be reduced substantially. Depending on the length of a weighing section, it will thus be possible to weigh one or a plurality of hooks up to a whole group of hooks, which is to be removed by a smoke stick. Likewise, it is possible to determine the weight of the entire hook guide. In order to find out the tare weight of the hooks, the hook weight can be determined and set to "tare" through a reference run taking place without any products.

According to an exemplary embodiment, the suspension device comprises a hook guide on which the suspension hooks can circulate on their circulatory path. The hook guide has here the function of guiding the suspension hooks on their path and of carrying simultaneously the weight of the hooks. The hook guide may, at least sectionwise, be connected to a weighing cell. If, for example, the entire hook guide is connected to one or a plurality of weighing cells, it will be possible to determine the weight of all the sausages which are present on the suspension device at a certain time of measurement. However, it is also possible to determine the weight in only one or in a plurality of weighing sections of the hook guide. In this case, the weighing unit comprises a guide piece integrated in a weighing section of the hook guide and decoupled from the hook guide, the suspension hooks being adapted to be guided and held on said guide piece in the weighing section, and the guide piece being connected to the weighing cell. Hence, the inserted guide piece takes over the functions of the hook guide in the weighing section. Due to the fact that the guide piece is decoupled from the hook guide in the weighing section, the weight determined is exclusively the weight of the sausage or sausages that are arranged on the hooks in this weighing section. An arrangement of the type in question can be realized in a particularly cost-effective, space-saving and easy manner. During the measurement, the conveyance of the suspension hooks may e.g. be stopped for a certain measurement period, and the weight of the sausages on the hooks, which are arranged in the weighing section, can be determined. The weight of one or of a plurality of hooks, which travel across the weighing section within a certain time interval, may, however, also be determined continuously during the process. An arrangement of the type in question allows the use of a semiautomatic weighing system, in the case of which the operator himself triggers the weighing process, and also an automatic weighing system, in the case of which a control unit triggers and terminates the weighing process.

According to a special embodiment, the circumferentially extending hook guide comprises at least one recess, which has inserted therein a guide section of the guide piece, said guide section being connected to the weighing cell through a connecting portion. When a hook guide, which guides the upper hook area at two points arranged vertically one above the other, is used, it will be advantageous when, in the weighing section, the hook guide has provided therein an upper and a lower recess having inserted therein respective guide sections, which will then take over the function of the actual hook guide. The respective guide sections, which are decoupled from the rest of the guide, may then be interconnected via a connecting portion, the connecting portion being connected to the weighing cell. The hook guide may, however, also be removed completely in the weighing section and the decoupled guide piece may here be used for taking over the functions of the hook guide.

According to a special embodiment, the suspension device comprises a circulating drive element, e.g. a drive belt, in engagement with the suspension hooks. It is particularly advantageous that, for the purpose of weighing, the suspension hooks to be weighed can be decoupled from the drive element. To this end, it is, by way of example, in particular possible to move the guide piece in a direction transversely to the conveying direction of the sausages for the purpose of decoupling, such that the respective hook will move away from the drive element. An influence of the drive element on the weighing process is excluded in this way. This will allow even more accurate weighing of the individual sausages. After the weighing process the guide piece will e.g. move back, so that the suspension hooks will again be connected to the drive element.

The weighing section has a length of such a nature that the weight of at least one sausage can be determined on at least one suspension hook. The weighing section may, however, also have a length that allows weighing of a plurality of suspension hooks having sausages attached thereto. For example, 1 to 50 suspension hooks may be weighed in the weighing section, said weighing section having e.g. a length of 20 mm to 1500 mm. It follows that e.g. the weight of an entire sausage group, which is removed by a smoke stick, can be determined.

It will be particularly advantageous, when the suspension device comprises a display and operating unit, viz. a display unit, which is provided additionally to the display and operating unit of the filling machine and which is configured e.g. as a touchscreen. Optionally, this display and operating unit comprises an input device for starting the weighing process and/or an input device for entering a number of sausages to be weighed or for confirming that the number of sausages to be weighed is correct. Moreover, the display and operating unit may also display to the operator that a weighing process must be carried out, or it may indicate a weighing period. The additionally provided display and operating unit offers the advantage that, in particular in the case of manual and semiautomatic systems, it will always be guaranteed that the weight ascertained relates to the correct number of sausages. The error rate can thus be reduced substantially. Hence, it can be guaranteed that no incorrect closed loop control of the filling process will take place. By evaluating the weight data, it will then be possible to control the filling process.

The present disclosure also relates to a filling machine comprising the suspension device according to the present disclosure.

The weighing unit of the suspension device may here transmit the signals to an evaluation unit, the control unit of the filling machine being configured such that the filling parameters of the filling process, in particular the performance of the conveyor and/or the portion volume (e.g. the volume delivered by the feed pump per unit time or per portion), can be adapted depending on the weight signals detected. The suspension device according to the present disclosure, which has the weighing unit integrated therein, allows an exact determination of the portion weight, so that the filling parameters can be controlled and adjusted exactly. In view of the fact that the weighing unit is integrated in the suspension device, which is arranged in a filling line, the weighing unit will easily be able to communicate with the evaluation unit and the control unit of the filling machine, respectively, without any disturbing cable connections to or signal interference with a separate, more remote weighing unit. Hence, a compact array can be provided. The evaluation unit may e.g. be part of the control unit of the filling machine or it may be a separate module that communicates with the filling machine control.

The operating method for producing sausages according to the present disclosure comprises the step of determining for at least one sausage on at least one suspension hook the weight via the weighing unit at the suspension device. Weighing signals are transmitted to an evaluation unit by the weighing unit and the weighing cell of the latter. An evaluation unit of the type in question can determine the weight of an individual sausage or a value proportional thereto (e.g. a value for a plurality of sausages) and compare said value with a target value. In the case of deviations, filling parameters, in particular the conveying capacity and/or the portion volume of the filling process, can be adapted and controlled depending on the weight signals detected. Hence, an exact portion accuracy can be realized.

According to the method, it is either possible to determine the weight manually, in that a certain number of sausages or sausage chains or a sausage group is removed from the hooks and deposited on or suspended from a weighing tray, or it is also possible to determine the weight of the at least one sausage via a weighing cell while said sausage is suspended from at least one hook. This is particularly advantageous, since, in this case, the operator need not specially remove the sausages from the hooks and reattach the sausages to the hooks after weighing for the purpose of further processing, thus avoiding any interference with the production sequence.

According to an advantageous embodiment, a display is provided, which displays that weighing will have to be carried out. A suitable weighing time is predetermined by a control unit of the filling machine. In order to carry out an exact measurement, an input device is advantageously provided, through which the number of sausages to be weighed is entered and/or through which the correct number of sausages to be weighed can be entered or confirmed. Optionally, there is also provided a unit through which the weighing process is manually started.

It is, however, are also possible to carry out the weighing process automatically, e.g. at predefined time intervals or after a predefined production volume. A respective automatic operating method is particularly advantageous, since production can take place continuously and errors on the part of the operator can be excluded. An automatic weighing process leads to considerable improvements in performance and a reduction of costs. Weighing while the sausages are being conveyed and a continuous evaluation of these weighing signals allow a continuous adaptation and control of the filling parameters.

According to an exemplary embodiment, the evaluation unit has supplied thereto weight signals and a number of sausages weighed, the weight per sausage being determined (or a value proportional thereto, e.g. a value for a plurality of sausages) and compared with a target value, by way of example. The filling parameters of the filling process will only be adapted, if a maximum admissible deviation is not exceeded. In this way, it can be guaranteed that errors in the number of sausages taken into consideration for the evaluation will not lead to an incorrect closed loop control of the filling process. Thus, e.g. counting errors of operators can be compensated for, and also in an automatic process, where a control unit determines the number of sausages that represents the basis for evaluation, errors, in particular at the start of production, or errors caused by sausage bursts or production faults, can be compensated for. The deviation determined may e.g. be compared with a first limit value and a second limit value. If a first limit value is exceeded, the portion volume should be readjusted. If a second limit value, which is higher than the first limit value, is exceeded, no readjustment should be carried out, but an error report should be issued, or a further weighing process should be carried out on the basis of the correct number of pieces. This case will mainly occur during automatic operation.

BRIEF DESCRIPTION OF THE FIGURES

The present disclosure will be explained in more detail hereinafter with reference to the following figures.

DETAILED DESCRIPTION

Figure 1:
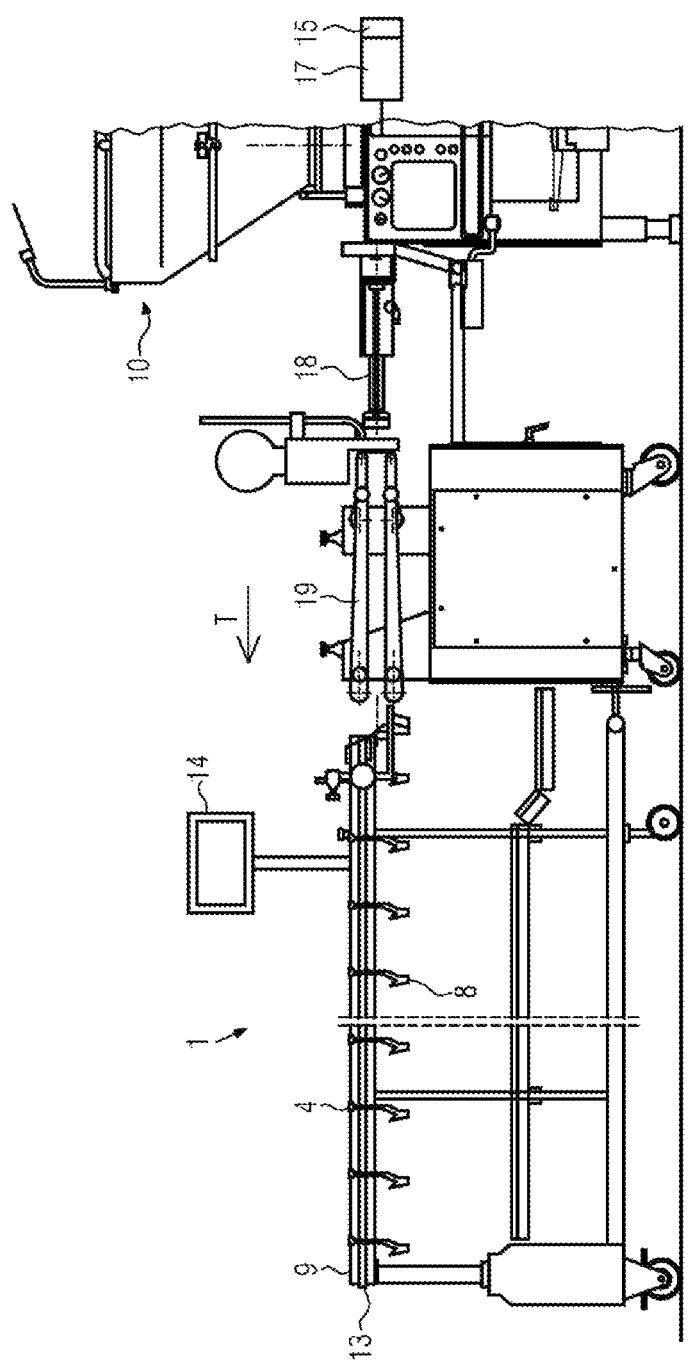
FIG. 1 shows a total view of a filling machine, seen from the side, with a suspension device according to the present disclosure.
Figures 10A, 10B, 10C:
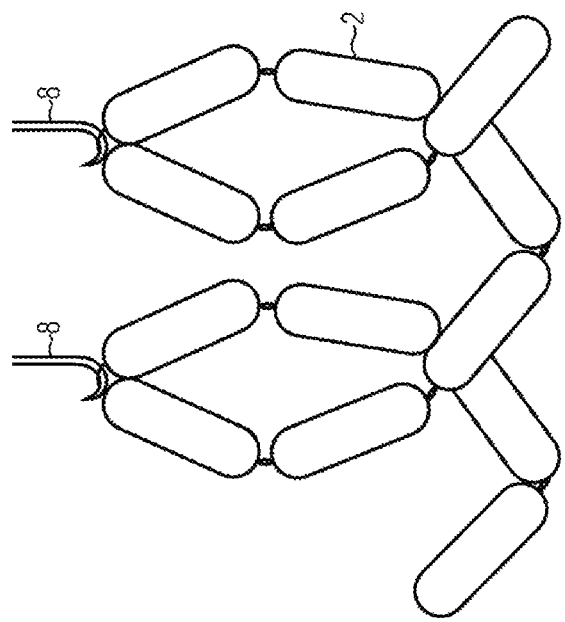
FIG. 10A shows a sausage chain suspended in the form of loops.
FIG. 10B shows sausages suspended in pairs from the hook at a point of division.
FIG. 10C shows schematically a sausage portion suspended from a hook on a lug.
Figure 11:
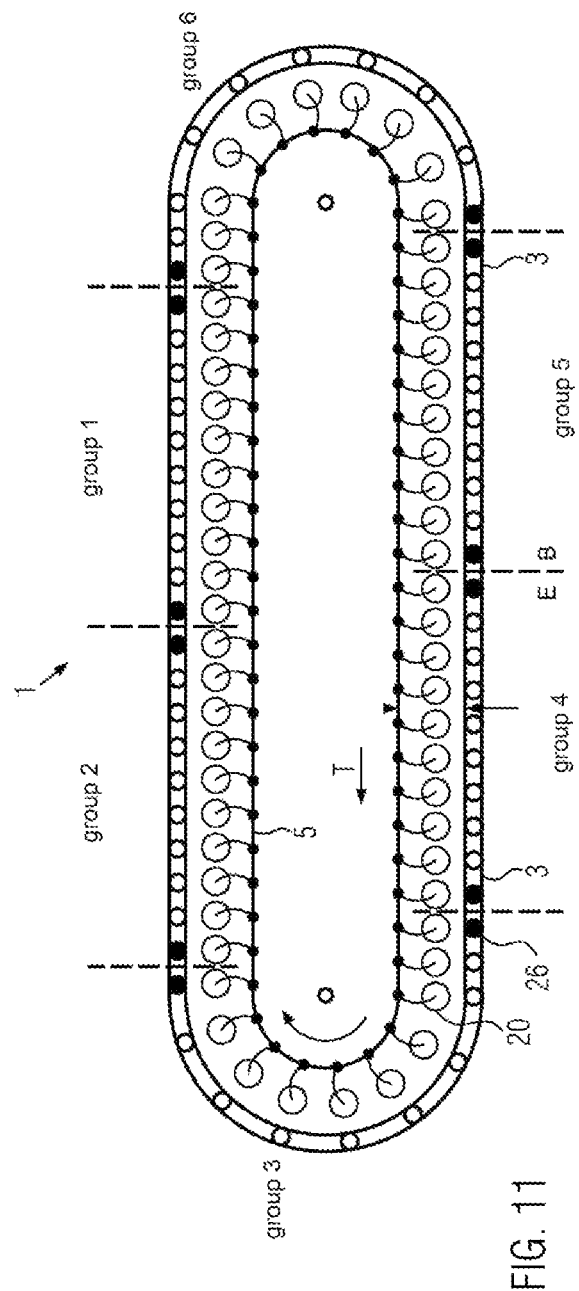
FIG. 11 shows a top view of a suspension device, in the case of which different sausage groups are shown.

FIG. 1 shows a side view of a filling machine 10 according to the present disclosure, by means of which sausage casings can be filled with a pasty mass via a filling tube 18 in the manner known. The sausages 2 are conveyed through a conveying unit 19 in a conveying direction T. The conveying unit 19 used here is a so-called length-dimensioning unit, which makes use of two circulating conveyor belts. The stuffed sausages can be twisted off and subdivided at specific points. It is also possible to produce a continuously stuffed sausage strand having no twist-off or subdivision points. The individual sausages produced may also be separated from one another at specific points, so that sausage chains comprising a plurality of sausages are produced, which can then be attached to suspension hooks 8 in groups. As can be seen from FIG. 1, a suspension device 1 is provided in the conveying direction downstream of the filling tube or, in the present case, downstream of the conveying unit 19, said suspension device 1 suspending, in the manner known, the stuffed sausages or sausage chains automatically in the form of loops with the aid of suspension hooks 8. The suspension device 1 may also be arranged directly after the filling tube (e.g., arranged after the filling tube with no other components between the suspension device and the filling tube, and/or with the suspension device and filling tube directly coupled to one another/physically contacting one another). In this case, the suspension hooks 8 are moved in the conveying direction via a drive element 13, e.g. in the form of a belt, a chain, etc., the suspension hooks 8 being conveyed back to the pick-up point in a circle when the sausages have been removed. A sausage chain (individual sausages in series) may here be suspended in the form of loops from hooks 8 or a plurality of sausages may be attached, e.g. in pairs, to a hook at a point of division, as shown in FIG. 10B, or a single sausage may be suspended from a lug, as shown in FIG. 10C. As can be seen from FIG. 11, the sausages produced may be subdivided into sausage groups 3, each sausage group comprising a certain number of hooks. The beginning and the end of a sausage group can be indicated by an indicating means 26, or one or a plurality of hooks between the sausage groups are left empty so that an operator will be able to discern the beginning and the end of a sausage group. Also colored markings of the hooks are realizable.

As shown in FIG. 1, the filling machine includes a control unit 17 and an evaluation unit 15. Control unit 17 may include a processor, input/output ports, a non-transitory computer-readable storage medium (e.g., read only memory chip, random access memory, keep alive memory, etc.), and a data bus. The storage medium of control unit 17 may be programmed with computer-readable data representing instructions executable by the processor for performing the methods described below, as well as other variants that are not specifically listed. In some examples, evaluation unit 15 may be included in control unit 17 (e.g., the evaluation unit 15 may be a set of instructions stored in the storage medium of control unit 17). In other examples, evaluation unit 15 may include one or more of a processor, input/output ports, a non-transitory computer-readable storage medium (e.g., read only memory chip, random access memory, keep alive memory, etc.), and a data bus. In such examples, the storage medium of evaluation unit 15 can be programmed with computer-readable data representing instructions executable by the processor for performing the methods described below, as well as other variants that are not specifically listed.

Control unit 17 may receive information from one or more sensors in the filling machine, such as weighing cell 7. Note that various combinations of sensors may be used to produce these and other measurements. Furthermore, control unit 17 may control a plurality of actuators of the filling machine, e.g. based on the signals from the plurality of sensors. Examples of actuators of the filling machine include suspension device 1, weighing unit 4, display and operating unit 14, drive element 13, the linear actuator used to couple/decouple the suspension hooks from the drive element, etc.

Figure 2:
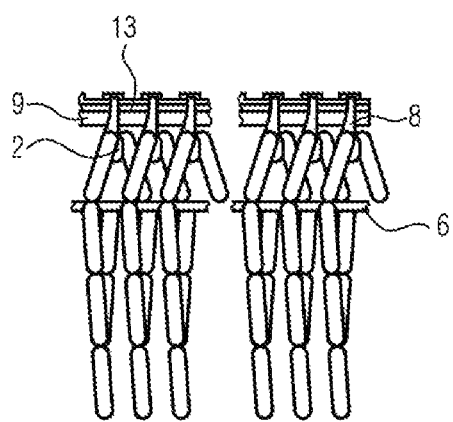
FIG. 2 shows a detail of a suspension device with a plurality of suspension hooks, from which sausage chains are suspended in loops.
Figure 3:
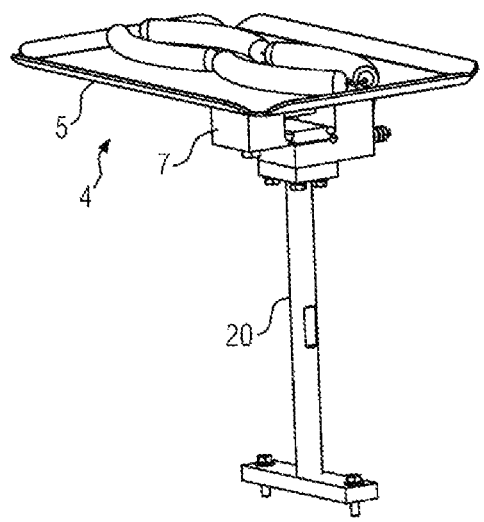
FIG. 3 shows a perspective view of a weighing unit according to the present disclosure.

FIG. 2 shows sausage chains suspended in the form of loops. For removing and further processing the sausages, a smoke stick 6 is, as can be seen from FIG. 2, inserted into the loops (either manually or automatically via a device for inserting a smoke stick or a handling system such as a robot) and removed upwards.

Figure 12:
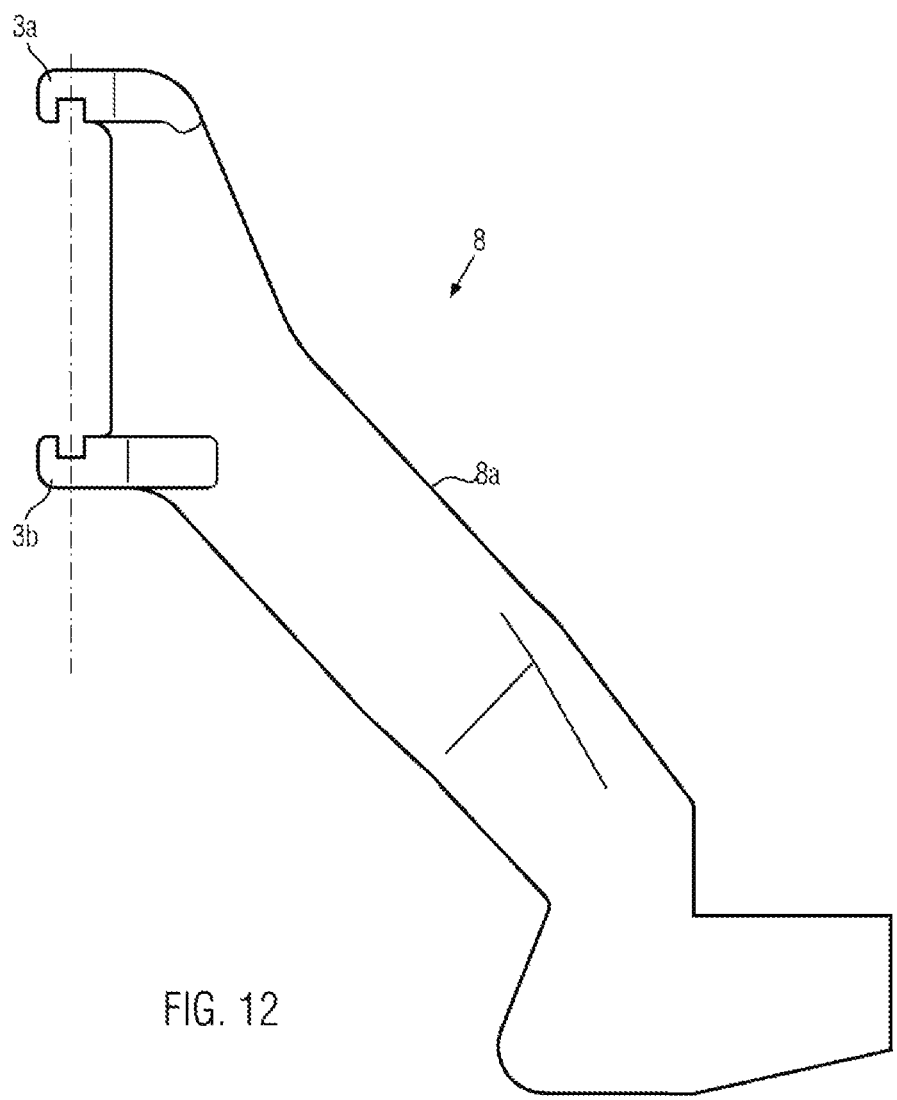
FIG. 12 shows schematically a side view of a suspension hook.

FIG. 12 shows a suspension hook in more detail. The suspension hook 8 comprises a support arm 8a comprising at its upper end a fastening section 3a, 3b. The fastening section 3a, 3b can be used for fastening the suspension hook to the suspension unit or a holding device of the suspension unit, in this case a hook guide 9. The fastening section 3a, 3b is here e.g. provided with a groove in which the hook guide 9 (cf. e.g. FIG. 7A) extends. The hook guide 9 guides the hook in the conveying direction T and carries the weight.

According to the present disclosure, the portion weight, e.g. the weight per sausage produced (or a proportional weight for a plurality of sausages), is to be determined, so that, in the case of deviations, the filling parameters of the filling machine 10 can be adapted or controlled in a suitable manner. According to the present disclosure, the suspension device 1 has integrated therein a weighing unit 4 for this purpose.

Figure 4A:
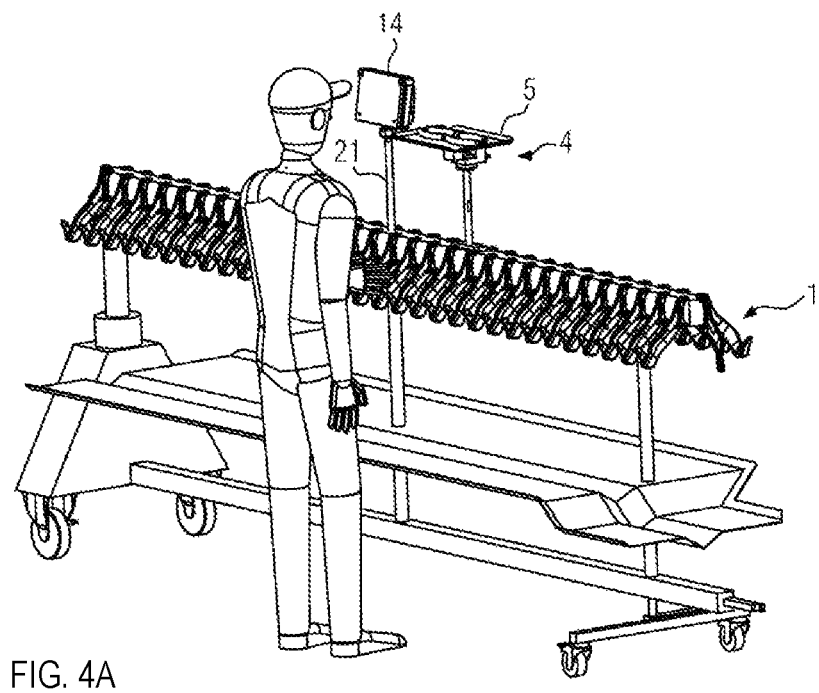
FIG. 4A shows schematically a perspective view of a suspension device according to an embodiment of the present disclosure.
Figure 4B:
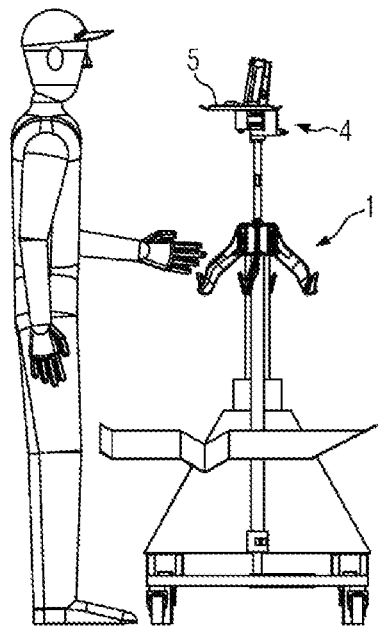
FIG. 4B shows a front view of the embodiment shown in FIG. 4A.
Figure 5:
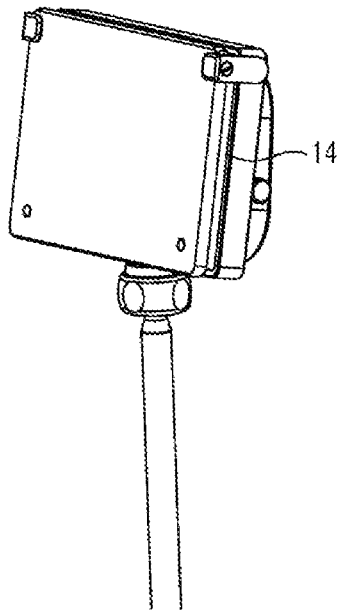
FIG. 5 shows a display for a suspension device according to the present disclosure.
Figure 4C:
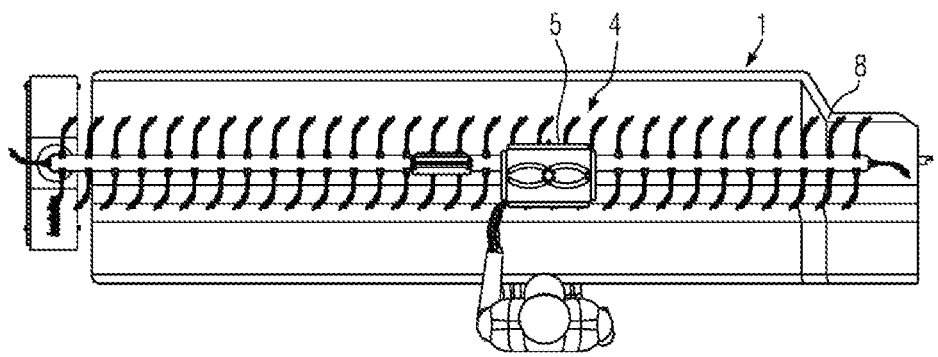
FIG. 4C shows a top view of the embodiment shown in FIGS. 4A and 4B.
Figure 6A:
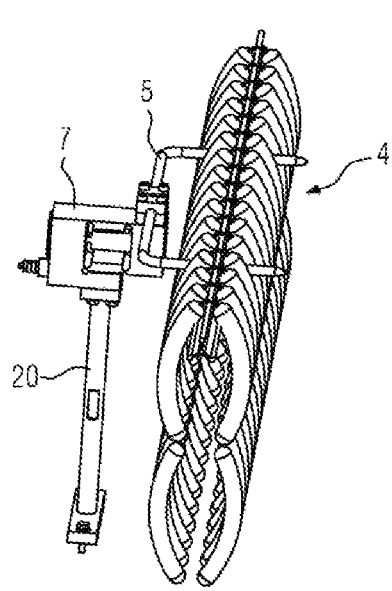
FIG. 6A shows a weighing unit for a suspension device according to the present disclosure.
Figure 6C:
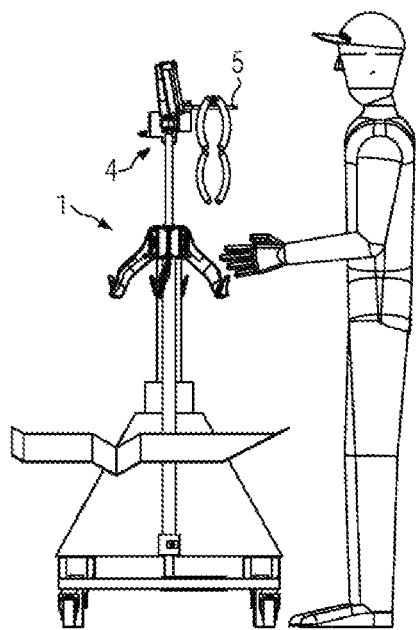
FIG. 6C shows, in a front view, the suspension device shown in FIG. 6A.
Figure 6B:
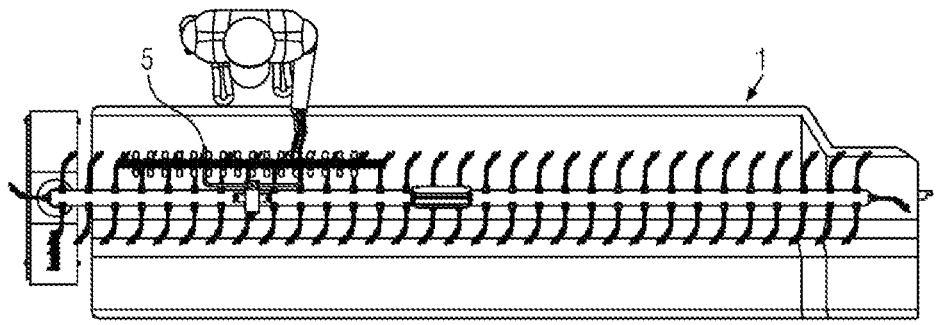
FIG. 6B shows, in a top view, the weighing unit shown in FIG. 6A in the suspension device.

The embodiment shown in FIGS. 3-6C relates to a manual weighing system, in the case of which an operator deposits sausages onto a weighing tray 5 connected to a weighing cell 7, or suspends the sausages from said weighing tray. The weighing cell 7 is here fixedly connected to the suspension device 1 via a stand 20 (cf. the embodiments in FIGS. 3-6C). The weighing cell 7 has fixed thereto e.g. a plate used as a weighing tray 5 for weighing individual or interconnected sausages 2, as can especially be seen from FIGS. 3, 4A-C. Alternatively, the weighing tray may be configured such that a smoke stick can be suspended therefrom, e.g. it may be configured as a fork, as shown in FIGS. 6A-C. The smoke stick with the sausages attached thereto can be placed onto the fork 5, which is connected to the weighing cell 7.

When seen in a vertical direction, the weighing tray 5 is advantageously arranged in a plane above the circulating suspension hooks 8. To this end, the stand 20 is fixed in position in the middle of the suspension device according to this embodiment, e.g. between the advancing and the returning track. In the present case, the stand 20 is fixed e.g. to a supporting bar 21 of the suspension device 1; said supporting bar may, for example, extend in the conveying direction. Due to the fact that the weighing tray 5 is provided in an upper central area, the operator will be able to work with the hooks and sausages with the weighing process taking place simultaneously in an upper area. In addition, this weighing unit can be used for both sides, e.g. the front and the rear side of the suspension device, as can be seen e.g. from FIGS. 4A and 4B.

Furthermore, the suspension device 1 comprises a display and operating unit 14, which is also fixed to the suspension device 1 and which is shown in more detail e.g. in FIGS. 4A and 5. The display and operating unit 14 communicates with the control unit 17, and comprises an input device for starting the weighing process and/or an input device for entering a number of sausages to be weighed or for confirming that the number of sausages to be weighed is correct. The operator may, for example, be informed via the display 14 that he has to carry out a weighing process in order to prevent a production stop through the control unit 17 of the filling machine due to non-execution of a weighing process. If the group of sausages to be weighed on a smoke stick is not a complete group of sausages, the operator will have to separate individual or interconnected portions from the group, close the now open ends and deposit the portions then on the weighing tray 5. The separating and closing may also take place through a machine provided upstream of the suspension device or automatically by a device integrated in the suspension device. After having been weighed, the portions of the group are returned to the production process, so as to guarantee a high capacity utilization of the smoke stick. Upon weighing a specific number of sausages or upon weighing the smoke stick having the sausage loops attached thereto, the operator must take care that the number of sausages is correct, since otherwise the measurement result and the closed loop control of the filling process will be wrong. According to an exemplary embodiment, the operator can ascertain the number of portions before the weighing process and enter it into the display and operating unit 14. This is particularly advantageous, since the display and operating unit 14, e.g. a touchscreen, is provided directly at the suspension device. Alternatively, these values may also be entered at an operating unit of the filling machine which is not provided directly at the suspension device. It is also possible that the number of sausages to be weighed is already indicated via the display and operating unit 14, and that the operator simply confirms at the display and operating unit 14 the specific number of sausages to be weighed. Furthermore, the display and operating unit 14 may comprise an input device for starting the weighing process. In some examples, when the weight is determined manually, the suspension device will be stopped (e.g., via the control unit 17 sending a signal to an actuator of the suspension device to stop circulation of the suspension device). The weighed individual sausages may e.g. be reattached to the hooks. The sausages weighed on a smoke stick may be then be subjected to a subsequent process step.

Figure 7A:
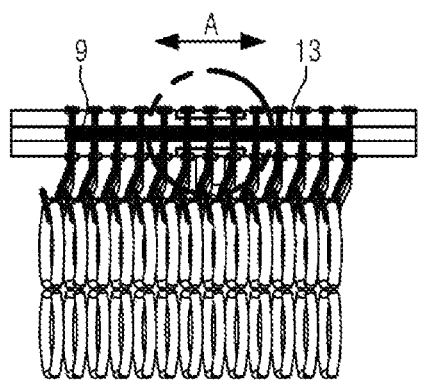
FIG. 7A shows a partial view of a suspension device according to a further embodiment of the present disclosure.
Figure 7B:
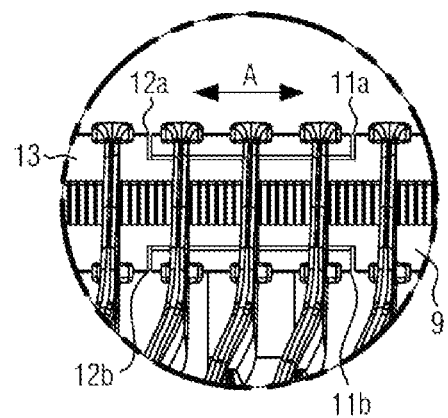
FIG. 7B shows an enlarged detail of FIG. 7A.
Figure 7C:
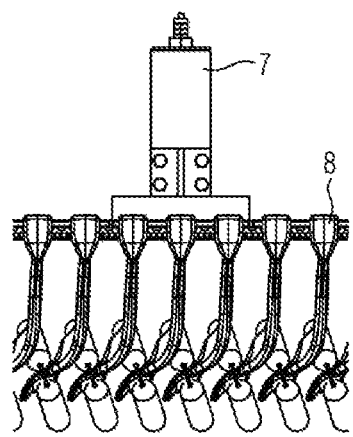
FIG. 7C shows a top view of the detail shown in FIG. 7B.
Figure 7D:
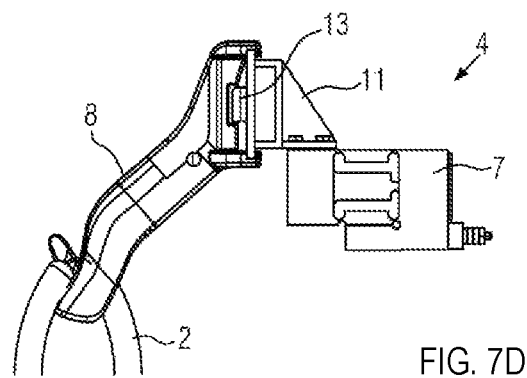
FIG. 7D shows a side view of a hook with a weighing unit according to the embodiment of the present disclosure shown in FIGS. 7A, 7B and 7C.
Figure 8:
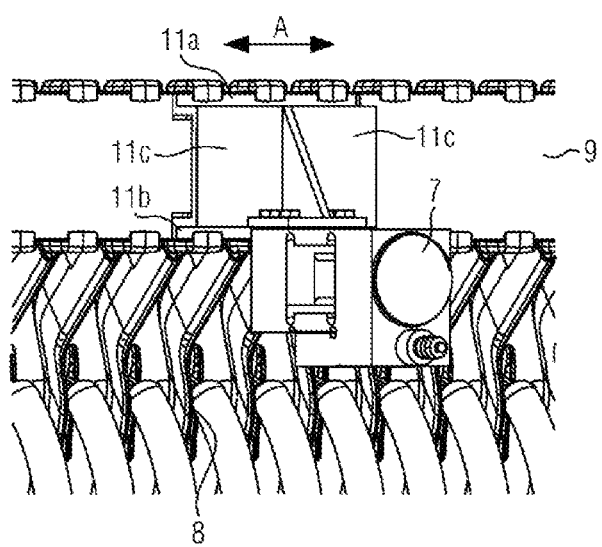
FIG. 8 shows schematically the back of the embodiment shown in FIGS. 7A-7D.

FIGS. 7A-8 show an exemplary embodiment of an integrated suspension device. In the embodiment shown in FIGS. 7A-8, the weighing unit 4 is integrated in the guide track of the suspension device 1 for the circulating suspension hooks 8, e.g. at least one sausage can be weighed on at least one hook. As will be explained in more detail hereinafter, this means that in one section the hook guide 9 is removed or recessed and the missing guide is replaced by a guide piece 11. The guide piece 11 will then take over the function of the hook guide 9, e.g. it carries and guides the suspension hooks 8 running over said guide piece. The guide piece 11 is in this case connected to the weighing cell 7 by a firm, direct mechanical connection (e.g., a rigid mechanical connection).

In the embodiment shown in FIGS. 7A and 8, the guide piece 11 is inserted in a weighing section A, said guide piece 11 being mechanically decoupled from the rest of the hook guide 9. In this concrete embodiment, the hook guide 9 is provided with an upper and a lower recess 12a,b having inserted therein respective guide sections 11a, 11b, as can in particular also be seen from FIG. 8. The grooves 3a,b (shown in detail in FIG. 12) of the hooks 8 run across the guide sections 11a,b when the hooks are moved in the conveying direction T. The guide sections 11a,b are here interconnected by a connecting portion 11c, which, as can be seen from FIG. 8, is connected to the weighing cell 7. This is only an exemplary embodiment. It is also possible to fully remove the hook guide 9 in the weighing section A and to replace it by the decoupled guide piece 11. Also a plurality of weighing sections A may be provided in a circulatory path.

For weight determination, the suspension hooks 8 having the sausages attached thereto are conveyed across the guide section of the guide piece 11 through a drive element 13, here in the form of a toothed belt. When the hook is located in the area of the weighing section A, e.g. in the area of the decoupled guide piece 11, its weight can be determined via the weighing unit 4, without the operator having to remove the product from the suspension hook 8 for the weighing process. One or a plurality of hooks up to a whole group of hooks, but also all the hooks, can be weighed, depending on the length of the weighing area A. If less than a whole group of sausages is to be weighed, the operator may perhaps have to separate individual or interconnected sausages in said group and close the ends of the portions, so that the neighboring suspension hooks 8, which have sausage loops attached thereto and which are not to be weighed, will not have any influence on the weighing process. Said separation and closing may also be executed by a machine located upstream of the suspension device 1 or automatically by a device integrated in the suspension device. In order to find out the tare weight of the hooks, the hook weight of each individual hook or also of groups of hooks can be determined and set to "tare" through a reference run taking place without any products. Hence, only the sausages on the hooks will be weighed during a weighing process. In order to guarantee that the suspension hooks 8 carry the correct number of sausages, an optical signal, e.g. a display on the display and operating unit 14, may be displayed to the operator before the weighing process, thus informing the operator that he will have to examine the hooks as to whether the number of sausages is complete. The hooks to be examined may e.g. be marked through an optical display, or their color may e.g. be different from that of the other hooks, so that the operator knows which hooks 8 he will have to examine. After said examination and in the event of a correct number of portions on the suspension hooks, the operator can confirm the number or, if necessary, correct it and/or trigger the weighing process on a display and operating unit by means of an input device, e.g. a button. After such triggering, the control unit 17 of the filling machine will measure the weight of the sausages on the hook or hooks by means of one or a plurality of weighing cells 7 during the next passage of the hook or hooks across the weighing section A. A measurement may be executed continuously. However, it is also possible that the drive element 13, e.g. in this case the toothed belt, stops so as to determine the weight of the portions on the suspension hooks 8 even more precisely. The weight signals or weight data are then evaluated in the evaluation unit 15. In so doing, the filling quantity or filling weight per sausage or a value proportional thereto can be determined. In the case of deviations from a target value, the filling process or respective filling parameters can be adapted or controlled.

According to an exemplary embodiment, the hook is separated from the drive element for the purpose of weighing. To this end, the drive element may stop. This embodiment also corresponds to the embodiment shown in FIGS. 7A-8, but in the present case the suspension hooks to be weighed can be decoupled from the drive element 13 for the purpose of weighing in that e.g. the guide piece 11 is movable in a direction transversely to the conveying direction T of the sausages for decoupling, such that the suspension hook 8 will move away from the drive element 13. As shown in particular in FIGS. 9A, B, C, this can be realized in a corresponding manner with the aid of a linear actuator, e.g. a lifting magnet 22 and a bearing unit 23. The weighing cell 7 is here e.g. displaceably supported on the bearing unit 23, said the bearing unit 23 being fixedly connected to the suspension device 1. Making use of the above-mentioned lifting magnet 22, the weighing cell 7 together with the guide piece 11 and the suspension hooks 8 having the sausage loops attached thereto are moved away (e.g., in the horizontal direction indicated by the arrow in FIG. 9B) from the drive element, in this case drive element 13, so that one or a plurality of hooks 8 are no longer connected to the drive element 13.

Figure 9A:
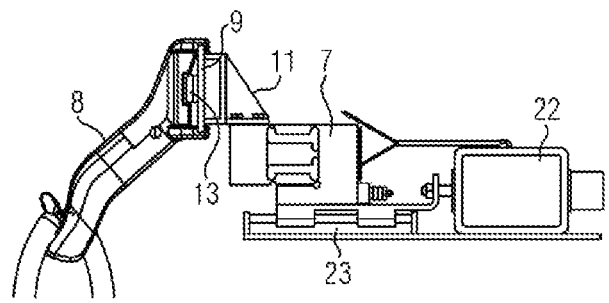
FIG. 9A shows a side view according to an exemplary embodiment of a suspension device, in the case of which a suspension hook is connected to a drive element.

FIG. 9A shows a hook connected to the drive element 13 in the upper area thereof. The drive element runs between the stationary hook guide 9 and the upper area of the hooks 8.

Figure 9B:
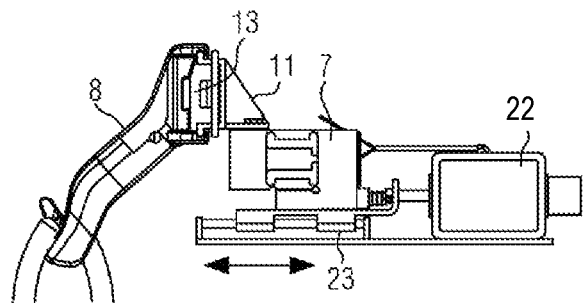
FIG. 9B shows the embodiment shown in FIG. 9A, in the case of which a hook is not connected to the drive element.

FIG. 9B shows the hook 8 which has been moved away from the drive element 13.

Figure 9C:
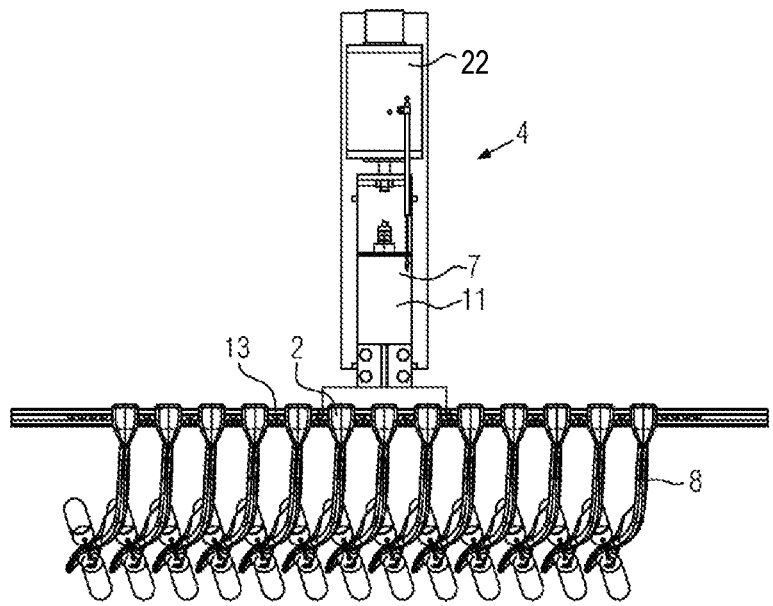
FIG. 9C shows a top view of FIG. 9B.

FIG. 9C shows a top view of the hooks, the guide piece 11, the bearing unit and the lifting magnet. By separating the hook from the drive element 13, any influence of the drive element 13 on the weighing process is excluded. In order to realize this, the drive element 13 may stop before the magnet 22 triggers a movement. After the weighing process, the weighing cell 7 together with the guide piece 11, the hooks 8, and the sausages 2 will move back on the bearing unit, so that the hook or hooks will again be connected to the drive element 13 and can be conveyed still further.

The above described structural design of the weighing unit 4 is suitable for a semiautomatic weighing system, in the case of which the operator can trigger the weighing process. However, the above shown structural design is also particularly suitable for an automatic weighing system, e.g. a system for weighing while the sausages are being conveyed. Whether or not the weighing process is operator-initiated or automatically initiated, the weighing process may include a series of actions, and the control unit 17 may include computer readable instructions stored in non-transitory memory and executable by a processor to perform the series of actions (including those described below) in conjunction with the various components, actuators, and sensors of the filling machine.

In the case of an automatic weighing system, the operator need not trigger a weighing process. The weighing process is carried out automatically at predefined time intervals and/or after a predefined production volume. Likewise, the weight of the sausages on the hooks (e.g., the weight of the sausages on all of the suspension hooks 8) may be measured, whenever the hooks pass across the weighing section A. In order to allow the ascertained weight data to be set off against the number of portions, a specific number of portions, which will be taken into consideration for evaluation, may be stored in non-transitory memory of control unit 17, by way of example. To this end, the control unit has stored in non-transitory memory therein a corresponding number of hooks, or it is e.g. calculated at the control unit how many hooks are weighed in a measuring period. The evaluation unit 15 may have supplied the weight signals as well as the number of sausages to be weighed to control unit 17, for example. A deviation of a weight ascertained for a sausage (or for a plurality of sausages) from a target value (e.g., a predetermined target value stored in non-transitory memory of the control unit) can be determined and compared with a maximum admissible deviation (e.g., a predetermined maximum admissible deviation value stored in non-transitory memory of the control unit). The control unit may further be configured to only adapt the filling parameters of the filling process if the maximum admissible deviation is not exceeded. If the examination is okay, the weight signals will be evaluated at the control unit and, if necessary, a closed loop control of the filling process will be initiated at the control unit for more precise portion weights. If the examination is not okay, a further weighing process may be carried out.

One or a plurality of hooks, a whole group of hooks, or all the hooks on the suspension device may be weighed. If less than the whole group of sausages is to be weighed, the operator may perhaps have to separate individual or interconnected portions in said group and close the ends, so that the hooks, which have sausage loops attached thereto and which are not to be weighed, will not have any influence on the weighing process. By means of a signal that may e.g. be an optical signal or by means of a display on a display and operating unit, the operator's attention may be drawn to said separation and closing before the weighing process. Said separation and closing may also be executed by a machine located upstream of the suspension device or automatically by a device integrated in the suspension device. Also in the present embodiment, the weighing process may be carried out while the sausages are being conveyed, or the drive element 13 may be stopped so as to determine the weight of the portions on the hooks, as has been described hereinbefore. In some examples, the hooks will be separated from the drive element 13 for the purpose of weight determination.

It follows that, according to the operating method according to the present disclosure, the weight of at least one sausage on at least one suspension hook 8 is determined through the weighing unit 4 in the suspension device 1. Weighing signals are transmitted to the evaluation unit 15 and filling parameters, in particular the performance of the conveyor and the portion volume of the filling process, are adapted via the control unit depending on the weight signals detected. This means that, in the event that the portion weight of a sausage is insufficient, the delivery rate per unit time of a pump will suitably be increased via the control unit so as to compensate the lack of weight. The weighing unit 4 according to the present disclosure is fully integrated in the filling machine for sausage production and fixedly connected to the suspension device, so that no further installation space in the production hall is required. Due to the fact that the weighing unit is installed inside the suspension device, the weighing unit 4 can be used flexibly at various locations of use. Due to the integrated weighing unit 4, the operator's workflow during weighing will be less interfered with, since he can carry out the weighing process directly on the suspension device. A possibly optical display on a display and operating unit 14 prevents additional production stops. As has been described hereinbefore, stopping will not be necessary during automatic operation. In the case of semiautomatic and automatic operation, it will no longer be necessary that the operator removes products from the suspension device 1 for the purpose of weighing and adds said products again after weighing; instead, he will be able to pass a smoke stick through the sausage loops after the weighing process (without previous weighing (tare) of the smoke stick) and deposit the smoke stick having the sausage loops attached thereto into the smoking trolley. This will reduce the operator's work load and it will lead to an increase of performance and to a reduction of costs.

Due to the evaluation and closed loop control of the weight signals through the evaluation unit 15, in particular a suitable software control, a fully integrated weighing system is obtained within a filling and portioning system for sausage products.

The decoupling of the suspension hooks 8 from the drive element 13 by the linearly movable guide piece 11 has been described hereinbefore. However, also other decoupling mechanisms are imaginable, which are realizable through rotational movements, cam tracks etc. in a force- and/or form-fit manner. Alternatively to the lifting magnet used in the above-mentioned embodiment, it is, of course, also possible to use some other actuator for decoupling the at least one hook from the drive element. If the hooks are entrained by a drive element (belts, chains or the like) having flexible slots/grooves, decoupling can take place in a deflection, since due to the fact that the slots/grooves are spread apart in the deflection, the slot/groove width will increase and the friction between the hooks and the drive element will thus be reduced. The determination and/or checking of the number of sausages may also be automated, e.g., an optical unit may be provided (such as a camera system or a proximity switch) or mechanical sensors (e.g. switching cams) for determining the number of hooks and/or sausages to be weighed.

The invention claimed is:

1. A suspension device for suspending sausages or sausage chains, comprising a plurality of circulating suspension hooks, wherein
the suspension device comprises an integrated weighing unit for weighing at least one sausage or at least one sausage chain, wherein the weighing unit is fixed to the suspension device and comprises a weighing tray for depositing thereon the at least one sausage or the at least one sausage chain and/or a weighing tray for depositing thereon a smoke stick in the form of a fork, the weighing tray being connected to a weighing cell.

2. The suspension device according to claim 1, wherein, when seen in a vertical direction, the weighing tray is arranged above the suspension hooks.

3. The suspension device according to claim 1, wherein the suspension device comprises an input device for starting a weighing process and/or an input device for entering a number of the sausages to be weighed or for confirming that the number of sausages to be weighed is correct, and/or said display and/or operating unit displaying that weighing is taking place.

4. A suspension device for suspending sausages or sausage chains, comprising a plurality of circulating suspension hooks, wherein
the suspension device comprises an integrated weighing unit for weighing at least one sausage or at least one sausage chain, wherein at least one of the suspension hooks is connected to a weighing cell such that the weight of the at least one sausage or the at least one sausage chain can be determined on the at least one of the suspension hooks.

5. The suspension device according to claim 4, wherein the suspension device comprises a hook guide on which the suspension hooks can circulate on their circulatory path, the hook guide being, at least sectionwise, connected to the weighing cell.

6. The suspension device according to claim 5, wherein the weighing unit comprises a guide piece integrated in a weighing section of the hook guide and decoupled from the hook guide, the circulating suspension hooks being adapted to be guided and held on said guide piece in the weighing section and the guide piece being connected to the weighing cell.

7. The suspension device according to claim 6, wherein the hook guide extends circumferentially and comprises in the weighing section at least one recess, each recess having inserted therein a corresponding guide section of the guide piece, the guide sections being connected to the weighing cell through a connecting portion.

8. The suspension device according to claim 7, wherein the at least one recess in the weighing section of the hook guide comprises an upper recess and a lower recess having inserted therein respective guide sections of the guide piece, the guide sections interconnected via the connecting portion.

9. The suspension device according to claim 7, wherein the hook guide is completely removed in the weighing section and replaced by the decoupled guide piece.

10. The suspension device according to claim 6, wherein the suspension device comprises a circulating drive element in engagement with the suspension hooks, wherein, for the purpose of weighing, the suspension hooks to be weighed can be decoupled from the drive element, and wherein the guide piece can be moved in a direction transversely to a conveying direction of the sausages for the purpose of decoupling, such that the suspension hooks to be weighed will move away from the drive element.

11. The suspension device according to claim 6, wherein the weighing section has a length of such a nature that the weight of the at least one sausage can be determined on 1 to 50 suspension hooks.

12. The suspension device according to claim 4, wherein the suspension device comprises an input device for starting a weighing process and/or an input device for entering a number of the sausages to be weighed or for confirming that the number of sausages to be weighed is correct, and/or said display and/or operating unit displaying that weighing is taking place.

13. A suspension device for suspending sausages or sausage chains, comprising a plurality of circulating suspension hooks, wherein
the suspension device comprises an integrated weighing unit for weighing at least one sausage or at least one sausage chain, wherein the weighing unit is able to transmit weighing signals to an evaluation unit, a control unit of the filling machine being configured such that filling parameters of a filling process can be adapted depending on the weight signals detected, the filling parameters including a performance of the conveyor and/or a portion volume.

14. An operating method for producing sausages with the filling machine according to claim 13, further comprising, for at least one sausage on at least one of the suspension hooks,
determining a weight of the at least one sausage via the weighing unit integrated in the suspension device,
transmitting a weight signal including the determined weight to the evaluation unit, and
adapting the filling parameters, including the performance of the conveyor and/or the portion volume of the filling process, depending on the weight signal detected.

15. The operating method according to claim 14, wherein the weight is determined manually in that at least one sausage is deposited on a sausage tray integrated in the suspension device or suspended from said sausage tray, or
wherein the weight of the at least one sausage is determined via a weighing cell of the weighing unit while said sausage is suspended from at least one hook.

16. The operating method according to claim 15, wherein a display displays that weighing will have to be carried out, wherein a number of sausages to be weighed is entered via an input device and/or wherein a correct number of sausages to be weighed is entered or confirmed via an input device, a unit being provided through which the weighing process is manually started.

17. The operating method according to claim 14, wherein the weighing process is carried out automatically at predefined time intervals or after a predefined production volume.

18. The operating method according to claim 14, further comprising supplying the weight signal and a number of sausages weighed to an evaluation unit, the weight signals including a weight of the sausages weighed, determining a deviation of the weight of the sausages weighed from a target value corresponding to the number of sausages weighed, and adapting the filling parameters only if the determined deviation does not exceed a maximum admissible deviation.

19. The operating method according to claim 18, wherein the determined deviation is compared with a first limit value and a second limit value which is higher than the first limit value.

20. The suspension device according to claim 13, wherein the suspension device comprises an input device for starting a weighing process and/or an input device for entering a number of the sausages to be weighed or for confirming that the number of sausages to be weighed is correct, and/or said display and/or operating unit displaying that weighing is taking place.

\* \* \* \* \*